United States Patent
Bilgili et al.

(10) Patent No.: US 11,962,952 B2
(45) Date of Patent: Apr. 16, 2024

(54) COMPUTER IMPLEMENTED METHOD AND SYSTEM FOR RETRIEVAL OF MULTI SPECTRAL BRDF PARAMETERS

(71) Applicant: Siemens Industry Software NV, Leuven (BE)

(72) Inventors: Ahmet Bilgili, The Hague (NL); Serkan Ergun, The Hague (NL)

(73) Assignee: Siemens Industry Software NV, Leuven (BE)

( * ) Notice: Subject to any disclaimer, the term of this patent is extended or adjusted under 35 U.S.C. 154(b) by 244 days.

(21) Appl. No.: 17/635,375

(22) PCT Filed: Aug. 16, 2019

(86) PCT No.: PCT/EP2019/071996
§ 371 (c)(1),
(2) Date: Feb. 14, 2022

(87) PCT Pub. No.: WO2021/032264
PCT Pub. Date: Feb. 25, 2021

(65) Prior Publication Data
US 2022/0272311 A1    Aug. 25, 2022

(51) Int. Cl.
*H04N 23/80* (2023.01)
*G06N 3/04* (2023.01)
*G06T 15/50* (2011.01)
*H04N 9/77* (2006.01)
*H04N 23/12* (2023.01)

(52) U.S. Cl.
CPC ............. *H04N 9/77* (2013.01); *G06N 3/04* (2013.01); *G06T 15/506* (2013.01); *H04N 23/12* (2023.01)

(58) Field of Classification Search
CPC .............................. H04N 23/80; G06T 15/506
USPC ...................................................... 348/207.99
See application file for complete search history.

(56) References Cited

U.S. PATENT DOCUMENTS

| | | |
|---|---|---|
| 2016/0162760 A1 | 6/2016 | Skaff et al. |
| 2018/0047208 A1 | 2/2018 | Marin et al. |
| 2019/0347526 A1* | 11/2019 | Sunkavalli ............. G06N 3/084 |
| 2021/0209340 A1* | 7/2021 | Wu ........................ G06V 10/764 |
| 2023/0154105 A1* | 5/2023 | Marin ....................... G06T 7/593 |
| | | 345/426 |

* cited by examiner

*Primary Examiner* — Anthony J Daniels
(74) *Attorney, Agent, or Firm* — Lempia Summerfield Katz LLC

(57) ABSTRACT

A method for retrieval of multi spectral bidirectional reflectance distribution function (BRDF) parameters by using red-green-blue-depth (RGB-D) data includes capturing, by an RGB-D camera, at least one image of one or more objects in a scene. The captured at least one image of the one or more objects includes RGB-D data including color and geometry information of the objects. A processing unit reconstructs the captured at least one image of the one or more objects to one or more 3D reconstructions by using the RGB-D data. A deep neural network classifies the BRDF of a surface of the one or more objects based on the 3D reconstructions. The deep neural network includes an input layer, an output layer, and at least one hidden layer between the input layer and the output layer. The multi spectral BRDF parameters are retrieved by approximating the classified BRDF by using an iterative optimization method.

18 Claims, 1 Drawing Sheet

COMPUTER IMPLEMENTED METHOD AND SYSTEM FOR RETRIEVAL OF MULTI SPECTRAL BRDF PARAMETERS

This application is the National Stage of International Application No. PCT/EP2019/071996, filed Aug. 16, 2019. The entire contents of this document are hereby incorporated herein by reference.

BACKGROUND

The present embodiments relate to a computer implemented method, system, handheld, and program for retrieval of multi spectral BRDF parameters.

In modern development procedures, a large number of different simulations are carried out before the actual development process and/or prototyping process begins. For the simulations and in order to achieve realistic simulation results, the materials to be used are to be simulated as realistically as possible in the simulations. Therefore, materials play an important role for rendering realistic looking 3D objects in simulations (e.g., computer graphics). For example, the materials used may define how the light may interact with the objects. This interaction is to be identified and described in way for further usage.

Some groups of materials are defined by functions that are referred to as bidirectional reflectance distribution functions (BRDFs). A BRDF defines how light, or other electromagnetic radiation, interacts with the surface of objects. The BRDF represents a function for the reflection behavior of surfaces of a material at any angle of incidence. For each light beam incident on the material at a given angle of incidence, the BRDF provides the quotient of radiation density and irradiance for each light beam emitted. Incident light may be, for example, not transmitted under the surface, or the incident light is approximated. For photorealistic rendering, the BRDF functions are assumed wavelength independent and are only retrieved for R, G, B channels. For sensor realistic rendering, wavelength may play an important role (e.g., lidar, infrared sensor, etc.). Because of the unknown behavior of the material in different states and therefore corresponding BRDFs, it is necessary to measure this information.

State-of-the-art-processes use complicated and extensive setups as well as expensive equipment. To measure, for example, the material of a car requires a large number of iterations in different local illumination models with the state-of-the-art processes, which take a high expenditure of time and hardware for this data acquisition and makes the measurement even more inefficient. Further, in the case of a large database of assets (e.g., geometrics, materials, textures belonging to a simulated world), which uses these materials, collecting and measuring of the materials is a costly option due to high memory requirements for easy storage in finely divided samples. In addition, multispectral properties are generally not present.

From US 2018/0047208 A1, a method is known of image capturing and image processing, such as the capture of three-dimensional scans of objects and the rendering of the three-dimensional scans in virtual scenes or environments.

SUMMARY AND DESCRIPTION

The scope of the present invention is defined solely by the appended claims and is not affected to any degree by the statements within this summary.

There is a need to measure the BRDFs of materials used for simulation with a more efficient method and system.

The present embodiments may obviate one or more of the drawbacks or limitations in the related art. For example, retrieval of multi spectral BRDF parameters. is improved. For example, the disadvantage mentioned above may be eliminated.

According to a first aspect, a computer implemented method for retrieval of multi spectral bidirectional reflectance distribution function (BRDF) parameters by using red-green-blue-depth (RGB-D) data is provided. The method includes capturing, by an RGB-D camera, at least one image of one or more objects in a scene. The captured at least one image of the one or more objects includes RGB-D data including color and geometry information of the objects.

The usage of an RGB-D camera provides images including highly accurate information of the object. The RGB-D image is a combination of an RGB image and a corresponding depth image. The depth image is an image channel in which each pixel relates to a distance between the image plane and the corresponding object in the RGB image.

The color and geometry information may include information of the points on the surface of the one or more objects. The information may include the RGB values and the depth values (e.g., the distance of these points taken from a specific direction of the RGB-D camera). The RGB values include red, green, and blue color components for each individual point. The color of each point, respectively, of each pixel in the image is determined by the combination of the red, green, and blue intensities stored in each color plane of the pixel location. The image may be stored in a graphics file format having, for example, 24-bit, where the red, green, and blue components are 8 bits for each. This yields a potential of 16 million colors. Further, graphics file formats may be used, for example, 8-bit or 16-bit, where a similar bit distribution as for 24-bit is applied.

The method includes reconstructing, by a processing unit, the captured at least one image of the one or more objects to one or more 3D reconstructions by using the RGB-D data. The reconstruction step may include the digital creation of the surface of the object that to some degree conforms to the points taken by the RGB-D camera.

The method also includes classifying, by a deep neural network, the BRDF of a surface of the one or more objects based on the 3D reconstructions. The deep neural network includes an input layer, an output layer, and at least one hidden layer between the input layer and the output layer.

The method includes retrieving the multi spectral BRDF parameters by approximating the classified BRDF by using an iterative optimization method.

With the method and system according to the present embodiments, it is possible to retrieve multi spectral properties of materials based on the material type that is unknown but required for sensor realistic rendering.

Further, the optimization procedure includes a classification and multi spectral parameter estimation, which makes the retrieval of the multi spectral BRDF parameters more efficient, faster, and accurate.

In one embodiment, the retrieved BRDF parameters of the objects may be used to verify the correct operation of sensors (e.g., in cars) and/or calibrate the sensors for correct measuring of the surface of objects and thus also the objects (e.g., cars, road signs) themselves. For example, to recognize objects is important for autonomous driving. The sensors of the cars are to detect each object that is located in the surroundings of the car independent of the material and within each light situation (e.g., reflection, intensity, etc.). The verification of the sensors in simulations by using the retrieved BRDF parameters for the simulations is more efficient because the verification and calibration for all the materials are to no longer be performed outside in the real environment under changing light conditions. Each light condition and the material behavior, described by the BRDF function, is available.

The retrieved multi spectral BRDF parameters of the materials may be stored in a material asset database and may be used for simulation and testing purposes as well as for creating digital environments and objects in computer and movie scenarios.

In an embodiment, the step of retrieval of the multi spectral BRDF parameter further includes estimating the spectral parameters of the BRDF.

In an embodiment, the retrieval of the multi spectral BRDF parameter further includes estimating the spectral properties of the environment map. The spectral properties of the environment map describe the light coming of all direction to the point for which the BRDF parameter are estimated.

Typically, the BRDF is written as a function of two unit vectors and of the wavelength. The two vectors encode the incident and outgoing directions of reflectance relative to the surface normal. The BRDF measures how much light is scattered in a second direction, when arriving in a first direction. In general, the BRDFs are modeled as functions with a parameter p that is independent of the wavelength $\lambda$. By using a spherical harmonics-based function per $\lambda$, the environment map may be modeled. When an object is reconstructed using an RGB-D camera, the reconstruction has an integration of spectral curve (e.g., camera spectral curve) per RGB channel per point on object reflectance, which is a combination of the BRDF and the environment. In this way, the spectral BRDF parameter may be retrieved.

In an embodiment, the 3D reconstruction of the one or more objects includes the RGB values and surface normal of the one or more objects. The surface normal (e.g., normal) may be an object such as a line or vector that is perpendicular to a given object. For example, in two dimensions, the normal line to a curve at a given point is the line perpendicular to the tangent line to the curve at the point. In three dimensions, a normal to a surface at a point of the object is a vector perpendicular to the tangent plane of the surface at the point. The normal may be used to determine an orientation of a surface towards a light source for, for example, flat shading, or the orientation of each of the corners to mimic a curved surface.

In an embodiment, the classified BRDF includes the spectral parameter of the BRDF and the spectral properties of an environmental mapping of the one or more objects. The spectral parameter of the BRDF may be measured by using the RGB-D specification of the camera. By knowing the spectral curves of the camera, the RGB-D model of the surface and also the outgoing light of the surface may be measured. In order to render an image with a spectral BRDF, an environment for the material to interact with is to be provided. In one embodiment, the environmental mapping describes the environment illumination given. The appearance of the surface (e.g., the reflecting surface) may be approximated. By providing the spectral properties of the environmental mapping, the retrieval of the multi spectral BRDF parameters is independent of the environment and its lighting condition. Therefore, no darkroom or laboratory that provides specific and adjustable lighting settings are required.

In an embodiment, the deep neural network includes a convolutional neural network. In another embodiment, the deep neural network includes a recurrent neural network. In another embodiment, the deep neural network includes a feedforward neural network.

A Deep Neural Network is a neural network with a certain complexity that consists of more than two layers. Deep Neural Networks use a mathematical model to process data in a complex way. Deep Neural Networks generally include a technology to simulate human brain activity, especially pattern recognition. A neural network includes an input layer, an output layer, and at least one hidden layer between the input layer and the output layer. Each layer performs specific types of sorting and filing of data. For example, neural networks are suitable for processing unmarked and/or unstructured data. For example, neural networks represent a kind of machine learning in which artificial intelligence is used to classify and sort information.

The network is a deep learning (e.g., as deep structured learning or hierarchical learning) artificial neural network (ANN). The network may contain more than one hidden layer. The network uses machine learning methods based on learning data representations, as opposed to task specific algorithms. In one embodiment, the learning is supervised or partially supervised. The network may also be composed of one or more convolutional layers. For example, the network may consist of a fully convolutional network that is trained in an end to end fashion with optionally skip connections. The network uses pooling and deconvolutional layers. The network takes as input an image and provides as output one or multiple images. The network is trained in an end-to-end fashion (e.g., by comparing directly the whole produced output with the whole ground truth, such as the whole segmentation mask (instead of considering patches and labels)). The network may be trained using deep supervision where the loss function consists of a combination of costs computed at each level of resolution.

A training may include providing different light directions and different RGB-D models for different materials that result in different BRDFs. The combination of input and expected output may be used to train the deep neural network.

According to an embodiment, the iterative optimization method includes a L2-norm optimization. The L2-norm optimization is equal to the least squares method. The method of least squares is an approach in regression analysis to approximate the solution of overdetermined systems. The method of least squares is basically minimizing the sum of the squares of the difference between the target value and the estimated values. Since a L2-norm squares the error (e.g., increasing by a lot if error>1), the model will see a much larger error than compared to, for example, the L1-norm, so the model is much more sensitive to this example, and adjusts the model to minimize this error. The L2-norm includes an analytical solution, which allows the L2-norm solutions to be calculated computationally efficiently.

According to another embodiment, the iterative optimization method includes a Levenberg-Marquandt-optimization. The Levenberg-Marquardt algorithm is a numerical optimization algorithm for solving nonlinear equalization problems using the least squares method. The method combines the Gauss Newton method with a regularization technique that forces descending function values. The Levenberg-Marquardt algorithm is much more robust than the Gauss-Newton method (e.g., converges with a high probability even under poor starting conditions).

In this way, by using an iterative optimization, the error that occurs while estimating the BRDF parameters due to different and not predictable incidence of light on the surface of the object may be minimized. Thus, the present embodiments allow to retrieve the BRDFs in unknown environment without previously defined light conditions. The object may be put in different lighting conditions, and the material of the object will behave according to these different lighting conditions.

In a further possible embodiment, the iterative optimization minimizes an approximating error until an amount of error within the estimation is lower than within a manual measurement. In this way, the error on the light and the error on the BRDF may be minimized. If the amount of error within the estimation is lower than within a manual measurement, the environment that corresponds to the spectrum parameters of the BRDF has been found. In this case, the parameters correspond to the BRDF parameters of the material that has been captured. The iteration may be stopped; otherwise, the iteration is continued. A manual measurement has been, for example, proceeded for the training phase of the deep neural network. In a further embodiment, a threshold value is added to the estimated error. The threshold value may be experimentally determined. As higher the threshold value is chosen, the higher is the accuracy of the estimation. As lower the threshold value is chosen, the lower is the time needed to compute the method and to retrieve the multi spectral BRDF parameters.

Up to now, the present embodiments have been described with respect to the claimed method. Features, advantages, or alternative embodiments herein may be assigned to the other objects (e.g., the computer program or a system, such as an apparatus or a computer program product) and vice versa. In other words, the subject matter that is described with respect to the system may be improved with features described in the context of the method and vice versa. In this case, the functional features of the method are embodied by structural units of the system and vice versa, respectively. Generally, in computer science, a software implementation and a corresponding hardware implementation are equivalent. Thus, for example, a method act for "storing" data may be performed with a storage unit and respective instructions to write data into the storage. For the sake of avoiding redundancy, although the apparatus may also be used in the alternative embodiments described with reference to the method, these embodiments are not explicitly described again for the apparatus.

In another aspect, the present embodiments may relate to a system for retrieval of multi spectral bidirectional reflectance distribution function (BRDF) parameters by using red-green-blue-depth (RGBD) data. The system includes an image capturing device, adapted to capture at least one image of one or more objects in a scene. The captured at least one image of the one or more objects includes RGBD data including color and geometry information of the objects. The system also includes a computer unit including a memory unit for storing a deep neural network including an input layer, an output layer, and at least one hidden layer between the input layer and the output layer. The computer unit includes at least one processing unit, adapted to store program instructions, which, when executed on the at least one processing unit, cause the system to: reconstruct the captured at least one image of the one or more objects to one or more 3D reconstructions by using the RGDB data; classify the BRDF types on a surface of the one or more objects based on the 3D reconstructions, using the deep neural network; and retrieve the multi spectral BRDF parameters by approximating the classified BRDF types by using an iterative optimization method.

In another aspect, the present embodiments may be implemented as a handheld configured to perform one of the embodiments of the method. The handheld may include, for example, a mobile phone, tablet, laptop, notebook, and/or PDA. A camera (e.g., an RGB-D camera) may be included in the handheld or connected via a wired or wireless connection to a connection interface of the handheld.

In another aspect, the present embodiments may be implemented as a computer program product including program elements that induce an electronic device to carry out the acts of the method for retrieval multi spectral bidirectional reflectance distribution function (BRDF) parameters according to one of the preceding method claims, when the program elements are loaded into a memory of the electronic device. The electronic device includes each device that is adapted to execute the program.

Not all acts of the method necessarily have to be performed on the same component or computer instance, but may also be performed on different computer instances.

In addition, it is possible that individual acts of the method described above may be carried out in one unit and the remaining components in another unit, as a distributed system.

The present embodiments (e.g., the method described above) may be provided as a computer program loadable into a processing unit of a network unit (e.g., a mobile device of a physician and/or a server). The computer program includes code adapted to perform the acts of the method as mentioned above when processed by the processing unit. The computer program may be stored on a non-volatile computer-readable medium or data carrier, such as a memory stick. The computer program may also be downloaded in downloadable form from a server entity. The computer program may be virtualized and/or may be distributed over different network nodes.

The computer program may be offered, placed on market, used, imported, and/or stored as (e.g., and thus may be part of) a computer program product. Thus, the computer program may be provided on a storage medium (e.g., computer readable medium, such as a computer disc, a memory stick, etc.). Alternatively, the computer program may be provided via download using a respective network connection to a server, which stores the computer program by providing a link to the server with the computer program stored thereon. A "computer-readable medium" or "storage medium" may be any device that may contain, store, communicate, propagate, or transport the program for use by or in connection with the instruction execution system, apparatus, or device. The computer readable medium may be, for example, but not limited to, an electronic, magnetic, optical, electromagnetic, infrared, or semiconductor system, apparatus, device, or propagation medium. More specific examples (e.g., a non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

The term "computer" or "computing unit" refers to any electronic device including a processor, such as a general-purpose central processing unit (CPU), a specific purpose processor, or a microcontroller. The processor is adapted to execute a special computing task (e.g., for retrieving of multi spectral bidirectional reflectance distribution function (BRDF) parameters). A computer or computing unit is capable of receiving data (e.g., input), of performing a sequence of predetermined operations thereupon, and of producing thereby a result in the form of information or signals (e.g., output). Depending on context, the term "computer" or "computing unit" may be either a processor, for example, or may refer more generally to a processor in association with an assemblage of interrelated elements contained within a single case or housing.

The systems and methods described herein may be embodied by a computer program or a plurality of computer programs, which may exist in a variety of forms both active and inactive in a single computer system or across multiple computer systems. For example, the plurality of computer programs may exist as software program(s) comprised of program instructions in source code, object code, executable code, or other formats for performing some of the acts. Any of the above may be embodied on a computer readable medium, which includes storage devices and signals, in compressed or uncompressed form.

The properties, features, and advantages of this present embodiments described above, as well as the manner the present embodiments are achieved, become clearer and more understandable in the light of the following description and embodiments, which will be described in more detail in the context of the drawings. This following description does not limit the invention on the contained embodiments. Same components or parts may be labeled with the same reference signs in different figures. In general, the figures are not for scale. An embodiment may also be any combination of the dependent claims or above embodiments with the respective independent claim.

DETAILED DESCRIPTION

Figure 1:
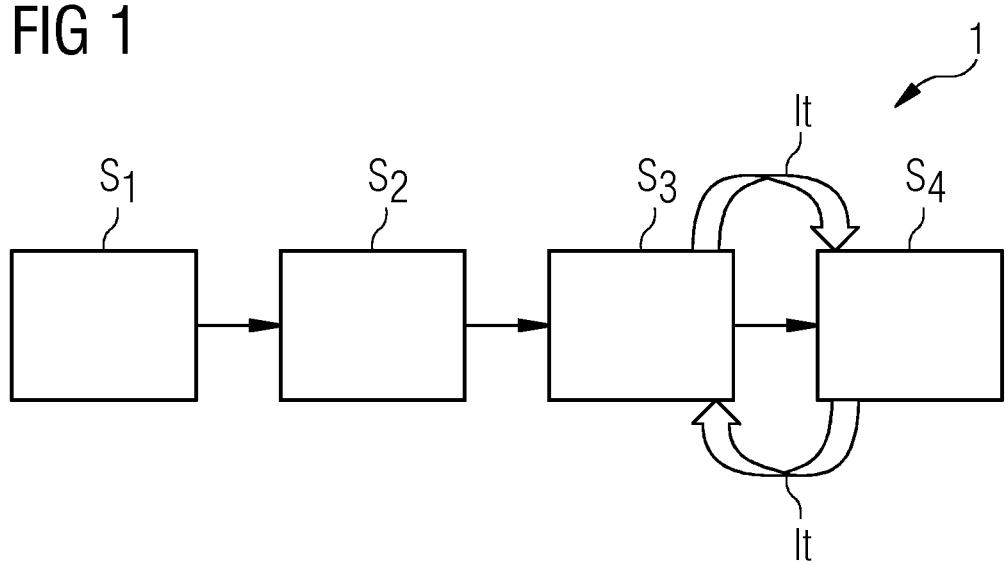
FIG. 1 shows a flow chart of a possible embodiment of a method for retrieval of multi spectral bidirectional reflectance distribution function (BRDF parameters.

FIG. 1 schematically shows a flowchart of a possible embodiment of a method 1 for retrieval of multi spectral bidirectional reflectance distribution function (BRDF) parameters. The BRDF is the function for the reflection behavior of surfaces of a material at any angle of incidence. For each light beam incident on the material at a given angle of incidence, the BRDF provides the quotient of radiation density and irradiance for each light beam emitted. BRDFs are used, for example, in realistic 3D computer graphics, where BRDFs represent part of the fundamental render equation and serve to represent surfaces as realistically and physically correct as possible.

The method includes, in the illustrated exemplary embodiment, a number of main acts. In a first act S1, at least one image of one or more objects 30 in a scene is captured by an RGB-D camera 11 (see FIG. 2 and the corresponding description). The captured at least one image of the one or objects 30 includes RGB-D data including color and geometry information of the objects 30. In act S1, the parameters of the material are deduced. This includes measuring by the RGB-D camera 11 for each incoming angle the outgoing angle to create a model for each individual material. Each material sketches the light on its surface in a different way, which is described by parameters. The parameters may be estimated by processing the images captured by the RGB-D camera 11.

By using the known spectral curves of the RGB-D camera 11, the multispectral BRDF properties are retrieved and the multi spectral environment maps may be discriminated. A material may be measured just by using an RGB-D camera 11 on one spot. For example, a plate with a surface of a unique material in a specific size is captured. The RGB-D camera 11 captures with its images the points of the surface of the unique material as pixels including the RGB-D data. The RGB-D data include the color information red, green, and blue as well as the depth information. The image captured by the RGB-D camera 11 includes all the light information (reflection) coming from the point of the surface at which the RGB-D camera 11 is pointing. Further, the light coming from the environment is summed up with the reflection of the surface. From this, the present embodiments estimate the light direction and the parameters of the BRDF.

In a further act S2, the at least one image of the one or more objects 30 is reconstructed by a processing unit to one or more 3D reconstructions by using the RGB-D data. The RGB-D data provided by the RGB-D camera includes the RGB values and the depth values. These values describe 3D points on the surface of the object 30 that are recorded by the images. The RGB values and the depth values may be used to create a surface that conforms to these points. The created surface is used to estimate the normal. This results in digital information of the point on the surface from the object 30 that includes directional RGB-D data. The digital information includes depth information of the point for each direction.

In a further act S3, the BRDF of a surface of the one or more objects 30 is classified by a deep neural network 20 based on the 3D reconstruction. The deep neural network 20 includes an input layer, an output layer, and at least one hidden layer between the input layer and the output layer. The 3D reconstruction defining the object as a surface normal and the direction of the RGB values are put in different layers of the deep neural network 20. The deep neural network 20 may be trained by several known input and output values. The training includes determining relations between the provided training input and output values. According to the trained data sets, further BRDF classifications may be performed by using unknown or new input data. The training may be performed, for example, for a number of material models, which are required for testing and simulation purposes.

In a further act S4, the multi spectral BRDF parameters are retrieved by approximating the classified BRDF by using an iterative optimization method. In an embodiment, act S4 may include estimating the spectral parameters of the BRDF and estimating the spectral properties of the environment map. Act S4 is iterated until a certain small error value is achieved. The environment map defines the incoming light from each direction. The environment properties include the amount value of light coming from each direction. The iterative optimization method stops when a criterion (e.g., an estimated amount of errors) is achieved. The amount of errors may be determined by practical studies with the goal of achieving the greatest accuracy and/or performance of the method. The optimization method may include the L2-norm optimization or the Levenberg-Marquandt-optimization. In one embodiment, with the method, the BRDF parameters of a surface from an object 30 may be estimated in each state and independent of the lighting condition.

In equation (1), the outgoing radiance of a surface from an object 30 may be calculated. The outgoing radiance $Lo(x, \omega_o, \lambda)$ may be calculated by the integral of $\Omega^+$ over the incoming radiance $Li(\omega_i, \lambda)$ on the surface point of object 30 and the bidirectional reflectance distribution function $\rho(x, \omega_i, \omega_o, \lambda, p)$.

$$Lo(x, \omega_o, \lambda) = \int_{\Omega^+} Li(\omega_i, \lambda)\rho(x, \omega_i, \omega_o, \lambda, p)(n \cdot \omega_i)d\omega_i \quad (1)$$

The bidirectional reflectance distribution function includes x as the location on the surface of the object 30 to be scanned. The bidirectional reflectance distribution function further includes the incoming direction vector $\omega_i$ and the outgoing direction vector $\omega_o$. The parameter $\lambda$ describes the wavelength of the light. The parameter n describes the surface normal.

In equation (2), the tristimulus representation of the color response (e.g., RGB, XYZ) after the reconstruction step is shown. From each point of the surface of the object 30, the RGB value including the color response $C_k(x, \omega_o)$ is estimated. Further, for estimating the color response $C_k(x, \omega_o)$, a wavelength-based stimuli function $\int_\lambda CIE_k(\lambda)$ is used. $CIE_k$ describes a standard curve (e.g., CIE 1931 RGB color matching function).

$$C_k(x, \omega_o) = \int_\lambda CIE_k(\lambda) \int_{\Omega^+} Li(\omega_i, \lambda)\rho(x, \omega_i, \omega_o, \lambda, p)(n \cdot \omega_i)d\omega_i d\lambda \quad (2)$$

In equation (3), specifying the classifications act S3, the wavelength $\lambda$ is to be discretized. Equation (3) describes the output $C_k(x, \omega_o)$ of the sensor (RBG-D camera). The parameters x, $\omega_o$ are the result of the reconstruction, and $C_k$ is the result of the RGB values. Equation (3) is to be modified to get the bidirectional reflectance distribution function p and the incoming radiance Li.

$$C_k(x, \omega_o) = \quad (3)$$
$$\sum_{j=0} CIE_k(\lambda_j) \int_{\Omega^+} Li(\omega_i, \lambda_j)\rho(x, \omega_i, \omega_o, \lambda_j, p)(n \cdot \omega_i)d\omega_i \Delta\lambda$$

In equation (5), the incoming light is represented with spherical harmonics. The equation (5) is manipulated by inserting equation (4) to achieve a better performance while computing the method and to optimize the processing of the method.

$$\sum_{m=0} c_{m,k,j} Y_m(\omega_i) \quad (4)$$

Equation (4) describes the spherical harmonics representation of the $Li(\omega_i, \lambda_j)$. The parameter $c_{m,k,j}$ describes the environment map, and the parameter $Y_m$ describes the spectral parameters.

$$C_k(x, \omega_o) = \quad (5)$$
$$\sum_{j=0} CIE_k(\lambda_j) \int_{\Omega^+} \sum_{m=0} c_{m,k,j} Y_m(\omega_i)\rho(x, \omega_i, \omega_o, \lambda_j, p)(n \cdot \omega_i)d\omega_i \Delta\lambda$$

In equation (6), the terms are rearranged. For the given $C_k(x, \omega_o)$, the environment map parameter (light) $c_{m,k,j}$ and the BRDF parameters p may be estimated.

$$C_k(x, \omega_o) = \quad (6)$$
$$\sum_{j=0} CIE_k(\lambda_j) \sum_{m=0} c_{m,k,j} \int_{\Omega^+} Y_m(\omega_i)\rho(x, \omega_i, \omega_o, \lambda_j, p)(n \cdot \omega_i)d\omega_i \Delta\lambda$$

The estimation includes the acts of classifying BRDF types on the surface by using the deep neural network. Further, a suitable initial guess for the BRDF p is selected. Following that, the estimation is repeated (e.g., continued) in a loop until convergence is achieved (e.g., error metric). The looping includes estimating the environment map parameter $c_{m,k,j}$ (e.g., non-parametric estimation using matrices) and estimating the BRDF p using different optimization methods, such as L2-norm or Levenberg-Marquandt-optimization.

Figure 2:
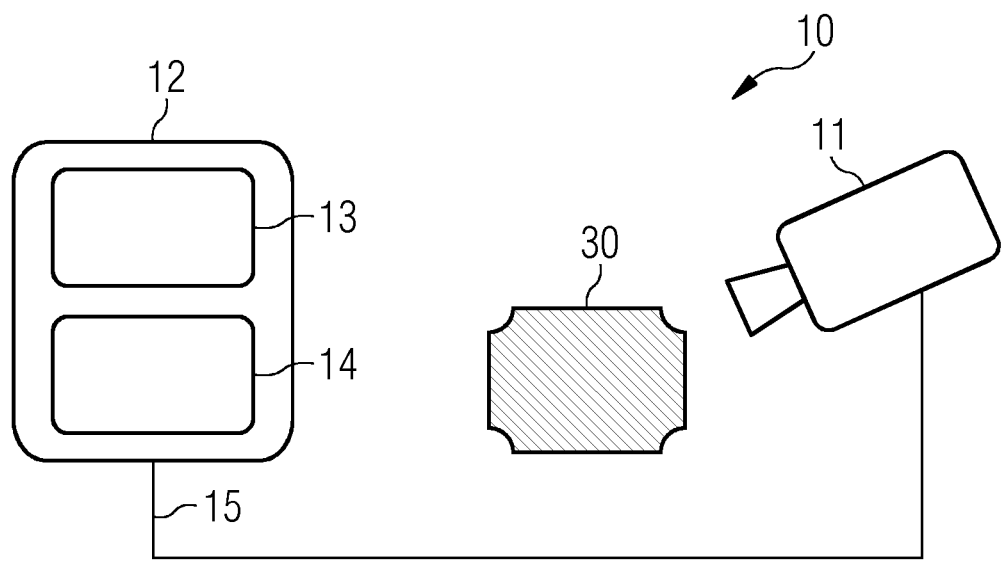
FIG. 2 shows a block diagram of a possible embodiment of a system architecture for retrieval of multi spectral bidirectional reflectance distribution function (BRDF) parameters by using red-green-blue-depth (RGB-D) data.

FIG. 2 schematically shows a block diagram of a possible embodiment of a system architecture 10 for retrieval of multi spectral bidirectional reflectance distribution function (BRDF) parameters by using red-green-blue-depth (RGB-D) data.

As shown in the block diagram of FIG. 2, the system 10 is used for retrieval of multi spectral bidirectional reflectance distribution function (BRDF) parameters by using red-green-blue-depth (RGB-D) data. The system 10 includes, in the illustrated embodiment, an RGB-D camera 11 and a computing unit 12. The RGB-D camera 11 and the computing unit 12 are constructed as two separate entities. In this embodiment, the RGB-D camera 11 and the computing unit 12 are connected via a communication connection 15. The communication connection 15 may be used for exchange of data between the computing unit 12 and the RGB-D camera 11 in both directions. The exchange of data may include the transmit and receive of control signals and/or data signals. The communication connection 15 may include a wireless communication connection such as Wi-Fi, Bluetooth, Bluetooth low energy, NFC, Infrared and/or a wired communication connection such as a serial communication connection including PCI-Express, Gigabit-Ethernet, HDMI, USB-Standard 3.1 and lower, SATA, DVI, or Ethernet. The RGB-D camera 11 and the computing unit 12 include communication connection interfaces for connecting to the corresponding communication connection 15.

In the illustrated embodiment, the computing unit 12 includes a memory unit 13 and a processing unit 14. The computing unit 12 of the system 10 for retrieval of multi spectral bidirectional reflectance distribution function (BRDF) parameters may be formed as a computer, personal computer, or workstation in a computer network and may include the processing unit 14 (e.g., processor or processors), a memory unit 13, and a system bus coupling various system components including the memory unit 13 to the processing unit 14. The system bus may be one of any number of types of bus structures, including, for example, a memory bus or memory controller, a peripheral bus, and a local bus using any number of bus architectures. The memory unit 13 may contain a read-only memory (ROM) and/or a random access memory (RAM). A basic input/output system (BIOS) containing basic routines that help to transfer information between elements within the PC (e.g., at startup) may be stored in the ROM. The computing unit may also include a hard disk drive for reading from and writing to a hard disk and an optical disk drive for reading or writing to a removable optical disk (e.g., magnetic) such as a compact disk (CD) or other optical media (e.g., magnetic). The drives and associated storage media provide non-volatile storage of machine-readable instructions, data structures, program modules, and other data for the computer. Although the exemplary environment described herein uses a hard disk and a removable optical disk (e.g., magnetic), a skilled person will appreciate that other types of storage media, such as flash memory cards, digital video disks, Random Access Memory (RAMs), Read Only Memory (ROM), and the like may be used in place of or in addition to the storage devices presented above. A number of program modules may be stored on the hard disk, optical disk (e.g., magnetic), ROM, or RAM, such as an operating system, one or more application programs, such as the method of calculating an output and/or other program modules, and/or program data.

A user may enter commands and information into the computer via input devices such as a keyboard and a pointing device. Other input devices such as a microphone, joystick, scanner, or the like may also be included. These and other input devices are often connected to the processing unit 14 via a serial interface coupled to the system bus. However, input devices may also be connected via other interfaces, such as a parallel port, a game port, or a universal serial bus (USB). A monitor (e.g., a GUI) or other type of display device may also be connected to the system bus via an interface such as a video adapter. In addition to the monitor, the computer may also contain other peripheral output devices such as speakers and printers.

The computing unit 12 may be operated in a network environment that defines logical connections to one or more remote computers. The remote computer may be another personal computer, a server, a router, a network PC, a peer device, or another shared network node and may contain many or all of the above elements related to the personal computer. Logical connections include a Local Area Network (LAN) and a Wide Area Network (WAN), an intranet, and the Internet.

Further, the computing unit 12 may be implemented as a system-on-a-chip design on a microcontroller or programmable chip, such as an ASSIC or FPGA.

The memory unit 13 may store the deep neural network 20.

The computing unit 12 is adapted to store program instructions, which when executed on the processing unit 14, cause the system to reconstruct the captured at least one image of the one or more objects 30 to one or more 3D reconstructions by using the RGB-D data. Further, the processing unit classifies the BRDF of a surface of the one or more objects 30 based on the 3D reconstructions, using the deep neural network 20. Further, the computing unit 12 retrieves the multi spectral BRDF parameters by approximating the classified BRDF by using an iterative optimization. The computing unit 12 may include a number of computing units that are configured to store and execute program instructions.

The RGB-D camera 11 may be a specific type of depth sensing camera device that may work in association with an RGB camera that is able to augment the conventional image of an object 30 with depth information (e.g., related with the distance to the sensor) in a per-pixel basis. The camera component may be an infrared sensor, an infrared camera, and/or an RGB camera. The synchronized output stream of depth and color information is converted into spatial information. In the near infrared range, the IR projector emits a coded dot pattern that is visible to the human eye. A CMOS sensor, for example, receives the image reflected by the object and/or scene and calculates the depth matrix with, for example, VGA resolution, to which an RGB image may be assigned, based on the camera distance across the parallaxes of the corresponding points. The calculation may be carried out with parallel algorithms on a chip in the camera, which considerably reduces the load on the host computer. This only describes an exemplary embodiment of an RGB-D camera 11 used in the system 10 according to the present embodiments. The present embodiments are not limited to the above described description. Further configurations and implementations of the RGB-D camera may be provided.

The RGB-D camera 11 is configured to capture at least one image of one or more objects 30 in a scene. In an embodiment, the RBD-D camera 11 captures a series of images of the one or more objects 30 in a scene depending on the surface (e.g., material) of the object 30. The image and/or series of images may be processed in the camera or by the processing unit 14 of the computing unit 12. In an embodiment, the RGB-D camera 11 may include a memory for storing the image and or the series of images before processing or transmitting the images. The captured at least one image of the one or more objects 30 includes RGB-D data including color and geometry information of the objects 30.

In an alternative embodiment of the system 10 according to the present embodiments, the system 10 including the RGB-D camera 11 and the computing unit 12 may be constructed in one single entity. The system 10 may be constructed as a handheld, such as a mobile phone, tablet, laptop, and/or PDA including an RGB-D camera 11, a processing unit 14, and a memory unit 13.

The scope of protection of the present embodiments is specified by the appended claims and is not restricted by the features explained in the description or shown in the drawing.

In summary, the invention relates to a computer implemented method and apparatus for retrieval of multi spectral bidirectional reflectance distribution function (BRDF) parameters by using red-green-blue-depth (RGBD) data. The method includes capturing S1 by an RGB-D camera 11 at least one image of one or more objects 30 in a scene. The captured at least one image of the one or more objects 30 includes RGB-D data including color and geometry information of the objects 30. The method also includes reconstructing S2, by a processing unit, the captured at least one image of the one or more objects 30 to one or more 3D reconstructions by using the RGB-D data, and classifying S3, by a deep neural network 20, the BRDF of a surface of the one or more objects 30 based on the 3D reconstructions. The deep neural network 20 includes an input layer, an output layer, and at least one hidden layer between the input layer and the output layer. The method includes retrieving S4 the multi spectral BRDF parameters by approximating the classified BRDF by using an iterative optimization method.

Due to the present embodiments, the multi spectral BRDF parameters of objects in specified environments may be retrieved.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for retrieval of multispectral bidirectional reflectance distribution function (BRDF) parameters by using red-green-blue-depth (RGB-D) data, the computer-implemented method comprising:
   capturing at least one image of one or more objects in a scene, wherein the captured at least one image of the one or more objects comprises RGB-D data including color and geometry information of the one or more objects;
   reconstructing the captured at least one image of the one or more objects to one or more three-dimensional (3D) reconstructions by using the RGB-D data;
   classifying, by a deep neural network, the BRDF of a surface of the one or more objects based on the one or more 3D reconstructions, wherein the deep neural network comprises an input layer, an output layer, and at least one hidden layer between the input layer and the output layer; and
   retrieving the multi spectral BRDF parameters by approximating the classified BRDF using an iterative optimization method.

2. The method of claim 1, wherein retrieving the multi spectral BRDF parameters further comprises:
   estimating the multi spectral parameters of the BRDF.

3. The method of claim 1, wherein retrieving the multi spectral BRDF parameters further comprises:
   estimating spectral properties of an environment map.

4. The method of claim 1, wherein the one or more 3D reconstructions of the one or more objects comprises RGB values and a surface normal of the one or more objects.

5. The method of claim 1, wherein the classified BRDF comprises the spectral parameter of the BRDF and the spectral properties of an environmental mapping of the one or more objects.

6. The method of claim 1, wherein the deep neural network comprises at least a convolutional neural network, a recurrent neural network, or a feedforward neural network.

7. The method of claim 1, wherein the iterative optimization comprises a L2-norm optimization or a Levenberg-Marquandt-optimization.

8. The method of claim 7, wherein the iterative optimization minimizes an approximating error until an amount of the error is lower than within a manual measurement.

9. A system for retrieval of multi lispectral bidirectional reflectance distribution function (BRDF) parameters by using red-green-blue-depth (RGB-D) data, the system comprising:
   an RGB-D camera configured to capture at least one image of one or more objects in a scene, wherein the captured at least one image of the one or more objects comprises RGB-D data including color and geometry information of the one or more objects; and
   a computer comprising:
      memory configured to store a deep neural network comprising an input layer, an output layer, and at least one hidden layer between the input layer and the output layer; and
      at least one processor configured to store program instructions that, when executed on the at least one processor, cause the system to:
         reconstruct the captured at least one image of the one or more objects to one or more three-dimensional (3D) reconstructions by using the RGB-D data;
         classify the BRDF of a surface of the one or more objects based on the one or more 3D reconstructions, using the deep neural network; and
         retrieve the multi lispectral BRDF parameters by approximation of the classified BRDF using an iterative optimization.

10. A handheld comprising:
   an RGB-D camera configured to capture at least one image of one or more objects in a scene, wherein the captured at least one image of the one or more objects comprises RGB-D data including color and geometry information of the one or more objects; and
   a computer comprising:
      memory configured to store a deep neural network comprising an input layer, an output layer, and at least one hidden layer between the input layer and the output layer; and
      at least one processor configured to store program instructions that, when executed on the at least one processor, cause the handheld to:
         reconstruct the captured at least one image of the one or more objects to one or more three-dimensional (3D) reconstructions by using the RGB-D data;
         classify the BRDF of a surface of the one or more objects based on the one or more 3D reconstructions, using the deep neural network; and
         retrieve the multi spectral BRDF parameters by approximation of the classified BRDF using an iterative optimization.

11. A non-transitory computer-readable storage medium that stores instructions executable by one or more processors to retrieve multispectral bidirectional reflectance distribution function (BRDF) parameters by using red-green-blue-depth (RGB-D) data, the instructions comprising:
   capturing at least one image of one or more objects in a scene, wherein the captured at least one image of the one or more objects comprises RGB-D data including color and geometry information of the one or more objects;
   reconstructing the captured at least one image of the one or more objects to one or more three-dimensional (3D) reconstructions by using the RGB-D data;
   classifying, by a deep neural network, the BRDF of a surface of the one or more objects based on the one or more 3D reconstructions, wherein the deep neural network comprises an input layer, an output layer, and at least one hidden layer between the input layer and the output layer; and
   retrieving the multi spectral BRDF parameters by approximating the classified BRDF mousing an iterative optimization method.

12. The non-transitory computer-readable storage medium of claim 11, wherein retrieving the multi spectral BRDF parameters further comprises:
   estimating the multi spectral parameters of the BRDF.

13. The non-transitory computer-readable storage of claim 11, wherein retrieving the multi spectral BRDF parameters further comprises:
estimating spectral properties of an environment map.

14. The non-transitory computer-readable storage medium of claim 11, wherein the one or more 3D reconstructions of the one or more objects comprises RGB values and a surface normal of the one or more objects.

15. The non-transitory computer-readable storage medium of claim 11, wherein the classified BRDF comprises the spectral parameter of the BRDF and the spectral properties of an environmental mapping of the one or more objects.

16. The non-transitory computer-readable storage medium of claim 11, wherein the deep neural network comprises at least a convolutional neural network, a recurrent neural network, or a feedforward neural network.

17. The non-transitory computer-readable storage medium of claim 11, wherein the iterative optimization comprises a L2-norm optimization or a Levenberg-Marquandt-optimization.

18. The non-transitory computer-readable storage medium claim 17, wherein the iterative optimization minimizes an approximating error until an amount of the error is lower than within a manual measurement.

* * * * *